United States Patent [19]

Chen

[11] Patent Number: 5,092,229
[45] Date of Patent: Mar. 3, 1992

[54] ENTIRELY UNIFORMLY HEATED RESPONSIVE COOKER

[76] Inventor: Kun M. Chen, P.O. Box 1-79, Taipei, Taiwan

[21] Appl. No.: 460,653

[22] Filed: Jan. 3, 1989

[51] Int. Cl.$^5$ .................... A47J 27/086; B65D 51/16
[52] U.S. Cl. ....................................... 99/337; 99/403; 99/413; 126/348; 126/369; 126/389; 137/493.7; 137/512.3; 137/530; 137/543.21; 219/438; 219/440; 220/204; 220/412; 220/428
[58] Field of Search ............... 137/530, 540, 493.7, 137/493.8, 512.3, 533.11, 543.21, 543.17, 177-178, 183, 197-198, 188; 126/348, 369, 369.1, 369.2, 377, 378, 389; 219/438-441; 220/202-204, 316, 412, 425, 427, 428, 469; 99/403, 410, 413, 337, 467, 426

[56] References Cited

U.S. PATENT DOCUMENTS

| | | | |
|---|---|---|---|
| 100,863 | 3/1870 | Corbett | 220/428 X |
| 1,752,584 | 4/1930 | Biette | 220/428 X |
| 2,515,879 | 7/1950 | Korn | 99/337 X |
| 2,595,389 | 5/1952 | Kinnaird | 137/493.7 |
| 2,952,764 | 9/1960 | Minami | 99/403 X |
| 4,238,996 | 12/1980 | Okuyama | 99/352 |
| 4,331,127 | 5/1982 | Grosso | 220/428 X |
| 4,574,776 | 3/1986 | Hidle | 99/413 X |
| 4,627,417 | 12/1986 | Von der Becke et al. | 126/369 |
| 4,728,778 | 3/1988 | Choi et al. | 219/438 |

FOREIGN PATENT DOCUMENTS

| | | | |
|---|---|---|---|
| 555059 | 8/1943 | United Kingdom | 137/540 |
| 565291 | 11/1944 | United Kingdom | 137/540 |
| 810836 | 3/1959 | United Kingdom | 137/493.8 |
| 2047117 | 11/1980 | United Kingdom | 219/440 |

*Primary Examiner*—Timothy F. Simone
*Assistant Examiner*—C. Cooley
*Attorney, Agent, or Firm*—Lalos & Keegan

[57] ABSTRACT

An entirely uniformly heated responsive cooker comprising an inner pot and an outer pot, wherein the inner pot neither directly touches the heating source nor the wall portion of the outer pot by means of exhalation valve means capable of adjusting proper pressure and thermal energy existing in the outer pot according to the cooking requirements of different foods, resulting in the food in the inner pot being entirely and evenly heated by thermal energy so that the cooking time is reduced, safety is ensured, and the original flavor of food is preserved to effectively achieve the object of energy-saving and economy.

17 Claims, 13 Drawing Sheets

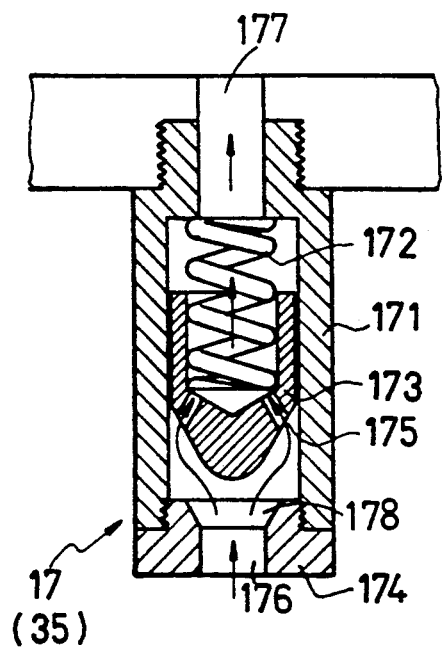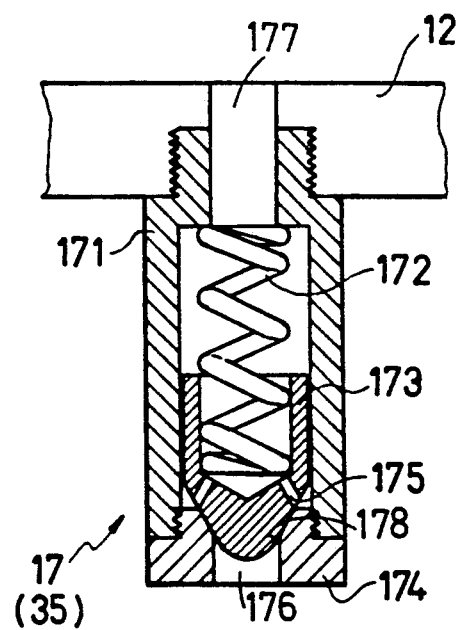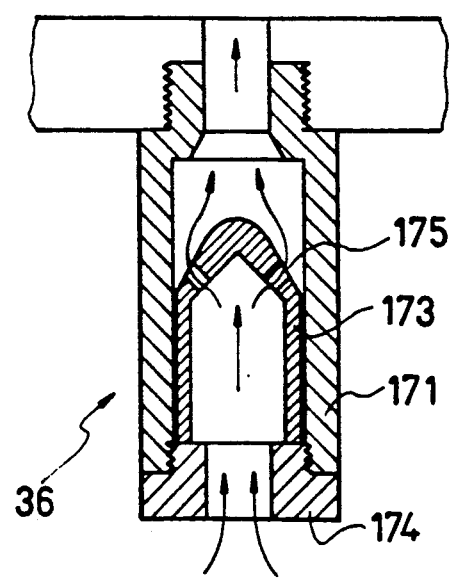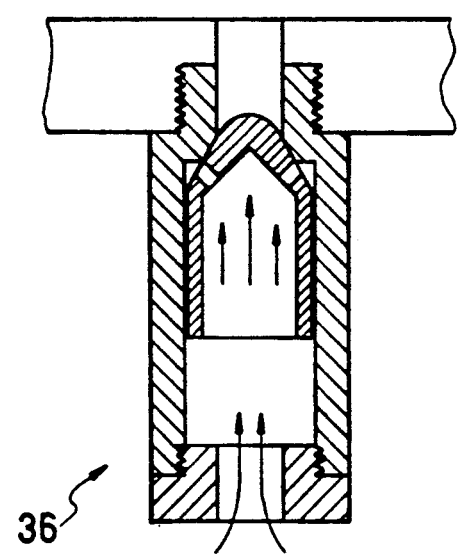

ENTIRELY UNIFORMLY HEATED RESPONSIVE COOKER

BACKGROUND OF THE INVENTION

This invention relates to a uniformly heated responsive cooker.

In modern living, various kinds of cookers are used, e.g., electric cookers, automatic rice cookers, stew cookers and so on. The majority are of a direct heating type, that is, an inner pot is placed in an outer pot which directly touches the heating source, whereby the inner pot is heated by the outer pot. In this way, food at the bottom will be heated first and its temperature will rise rapidly, whereas food at the upper part is heated slowly and indirectly. Because of the non-uniform heating, food at the bottom touching the heating source is heated too quickly and consequently the nutrients are almost totally destroyed in a short time. Also, the food at bottom is often charred or too tough, while food at upper part is not cooked enough. Consequently, the flavor of the food is greatly reduced. Furthermore, if the food is required to be simmered according to traditional cooking methods, much time is needed.

SUMMARY OF THE INVENTION

It is an object of the present invention to provide a uniformly heated responsive cooker including an inner and outer pot, wherein the inner pot is airtightly removably disposed in the outer pot, the bottom and outer wall of the inner pot being spaced from the outer pot and forming a closed heating space therebetween; whereby the pressure existing in the heating space can be properly adjusted by means of an exhalation valve means so that the food in the inner pot is uniformly entirely heated by the thermal energy and pressure in the outer pot.

According to the above objects, in a preferred embodiment, this invention includes two sets of exhalation valve means, one of which is composed of a pressure regulating valve (or constant pressure valve), a safety valve, a breathing valve and a cooling water auto-returning valve and the other of which is composed of a two-way venting valve.

It is another object of the present invention t provide the above cooker, wherein pressure is held steady in the heating space by the first exhalation valve means automatically by temporarily and repeatedly discharging the proper amount of thermal energy and pressure; after each incident of pressure discharging movement, the food temperature in the inner pot is responsively increased until the thermal energy conduction barrier between the heating space and the inner pot disappears, permitting the thermal energy produced in the space to be directly conducted to the inner pot and making the food in the inner pot be surrounded by thermal energy in the space whereby the food is heated and boiled entirely uniformly under same temperature and pressure so as to maintain the original taste and nutrition of food, and the cooker fully and effectively utilizes thermal energy to save cooking time and energy.

In one embodiment of this invention, the pressure limits 17 the exhalation valve means will be at the maximum tolerated pressure of the pressure regulating valve which is less than or equal to that of the constant pressure valve, while that of the pressure constant valve is less than that of safety valve. Thus, not only can the exhalation pressure be properly adjusted, but the safety of the cooker is also ensured.

It is a further object of the present invention to provide the above cooker, wherein during heating, steam flows through the venting opening on a lower pot cap and detours to a two-way venting valve of a second exhalation valve means on an upper pot cap and is finally discharged into the atmosphere, whereby the two-way venting valve can ensure that the lower pressure steam which is generated is not completely discharged into the air but is retained for some time between the lower pot cap and the inner pot to thereby enhance the heating effect; when the heating is terminated, steam will be exhaled by the two-way venting valve of second exhalation valve means for a finite time and finally stopped so that a finite amount of steam and heat can be retained in the inner pot to closedly steam the food, and then external air will flow back to said inner pot at the proper time to achieve a balance between the pressure inside the inner pot and the external pressure to allow easy opening of outer cover.

To best understand the present invention, lease refer to the following description and accompanying drawings wherein:

BRIEF DESCRIPTION OF THE DRAWINGS

FIG. 5B is a longitudinal sectional view, showing another embodiment of the constant pressure valve of this invention, disposed on the ring member in the closed state;

FIG. 5C is a longitudinal sectional view, showing another embodiment of the breathing valve of this invention, disposed on the ring member in the open state;

FIG. 6B is a longitudinal sectional view, showing the constant pressure valve of FIG. 5B in the open state;

FIG. 6C is a longitudinal sectional view, showing the breathing valve of FIG. 5C in the closed state;

FIGS. 13 and 14 show two embodiments of the exhalation valve means of this invention, in which FIG. 13 shows the exhalation valve means mounted on a pot cover of the outer pot while FIG. 14 shows the exhalation valve means mounted on the pot wall thereof;

For the convenience of description, the same or relevant elements in different embodiments are denoted by same reference numerals.

The present invention is primarily characterized in that the inner pot in which the food is stewed is not directly in contact with the heating source and the outer pot, and that the exhalation valve means are applied to regulate and set the steam pressure between the inner and outer pots to a predetermined value, whereby the inner pot is entirely uniformly heated under even temperature and pressure conditions for cooking the food. In such manner, the food can be thoroughly and perfectly stewed and cooked.

For easy description and understanding, the first embodiment of this invention will be described in detail as a major matter of this invention as follows:

DETAILED DESCRIPTION OF THE PREFERRED EMBODIMENT

Figure 1:
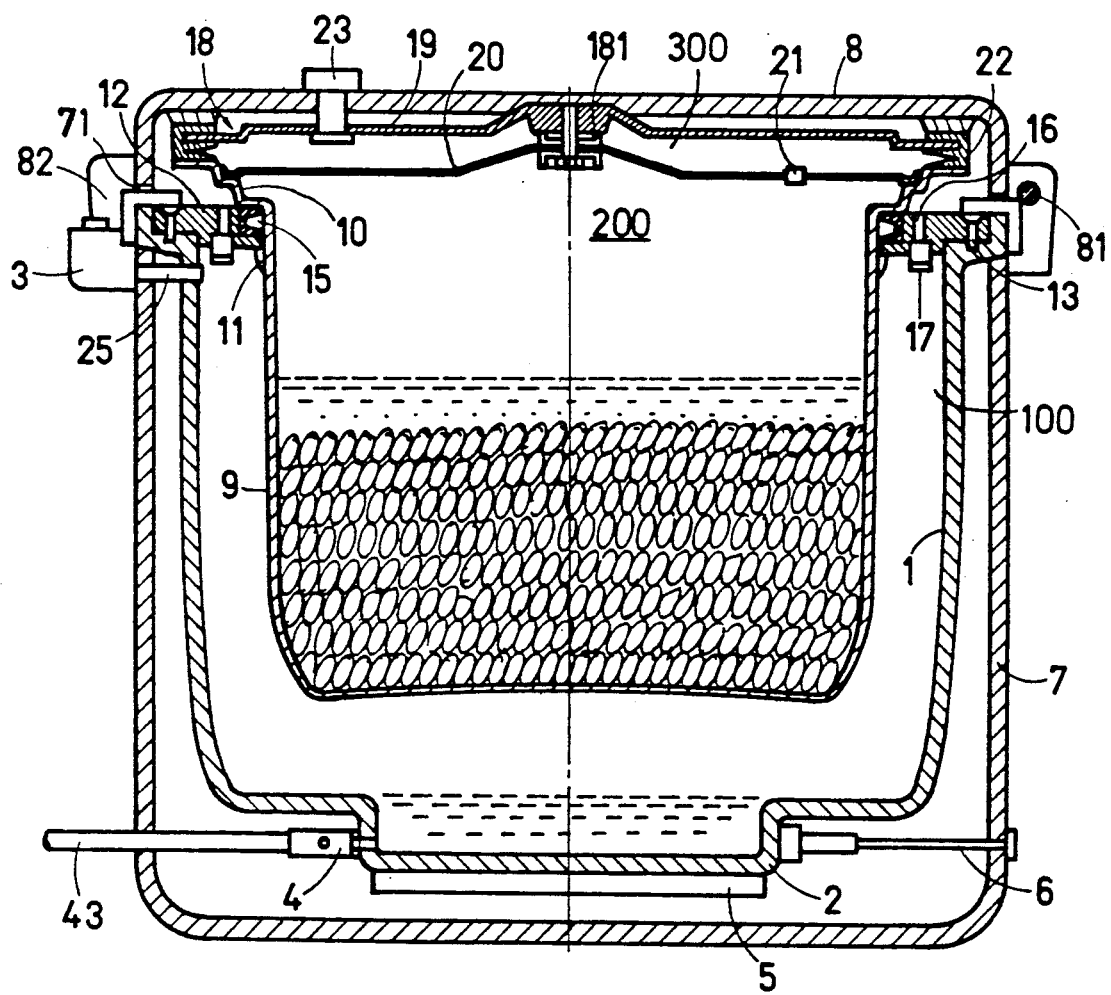
FIG. 1 is a longitudinal sectional view of a typical embodiment of this invention.
Figure 1:
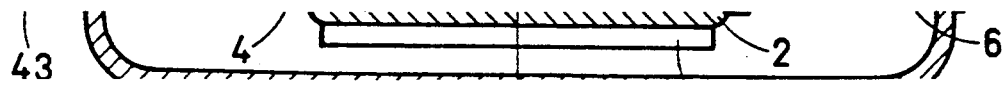

Please refer to FIG. 1 showing a longitudinal sectional view of first embodiment of this invention, in which there is a shallow depression 2 formed on the bottom of an outer pot 1 for containing water. A drain valve 4 and a drain pipe 43 are disposed on one side of the shallow depression 2 for drainage and cleaning of the depression 2. A heater 5 and a temperature-control breaker 6 are installed respectively on and beside the shallow depression 2. Housing 7 and an outer cover 8 are mounted outside the outer pot 1 for decoration.

An upper edge 10 of an inner pot 9 is formed with multi-stepped annular flanges to which a pot cap assembly 18 is fitted. Several projections 11 are further formed on the wall of inner pot 9 (see FIGS. 1 and 8). A ring member 12 including a ring packing 15 is installed and screwed on upper edge of outer pot 1 by means of several screws 13. Several recesses 14 are formed along inner periphery of ring member 12 (see FIG. 9). Ring packing 15 has a V-shaped cross section and is fitted on the inner periphery of ring member 12. Moreover, a number of vent holes 16 are formed on ring member 12 (see FIGS. 1, 8 and 9) for installation of a number of constant pressure valves 17. When projections 11 of inner pot 1 (see FIG. 8) are aligned with the recesses 14 of ring member 12, the inner pot can be lowered with its upper edge 10 closely opposed to the ring packing 15. In this position, the inner pot 9 can then be rotated to separate the projections 11 and recesses 14, thus being secured on the ring member 12. Neither the wall nor base of inner pot 9 will touch the outer pot, forming a first space 100 therebetween.

A pot ca assembly 18 is comprised of an upper cap 19 and a lower cap 20 and is fitted to the inner center of outer cover 8. On the lower pot cap 20 is disposed a vent hole 21. An airtight ring gasket 22 with V-shaped cross section is fitted to circumference of the upper pot cap 19, preventing air or steam leakage. Through the outer cover 8 and upper pot cap 19 is disposed a two-way venting valve 23. When the outer cover 8 is put onto the cooker, the upper and lower pot caps 19, 20 both fit on multi-stepped flange of upper edge of the inner pot 9, whereby, a second space 200 is formed between the lower pot cap 20 and food in the inner pot 9, and a third space 300 is formed between the upper pot cap 19 and the lower pot cap 20. The second and third spaces 200, 300 are in limited communication with each other through the vent hole 21.

A pivot 81 acts as an active joint for outer cover 8 such that when outer cover 8 is closed, it is locked by a holdfast 82. Both upper pot cap 19 and lower pot cap 20 fit on the multi-stepped flange of upper edge of the inner to 9. A buffer pad 181 is disposed on the center of outer cover 8, whereby when the outer cover is closed, the pad is pressed and the lower pot cap 20 is pushed by a reaction elastic force of the buffer pad 181 so that in case the pressure is too high, and vent hole 21 cannot sufficiently exhale the stem, the lower pot cap 20 will be raised by means of elasticity of the buffer pad 181 and the steam will be exhaled through periphery of the lower pot cap 20 to the upper pot cap 19, and then through the two-way venting valve 23 into atmosphere so as to form a roundabout path of thermal energy. In this way, the thermal energy stays between the inner pot and the pot cap assembly for a longer time to be fully utilized, thus saving energy.

In one of the embodiments of the exhalation valve means 3, the valve means is installed outside the housing 7 and communicates with the space between inner and outer pots via a tube 25 which pierces through the walls of housing 7 and outer pot 1.

Figure 2:
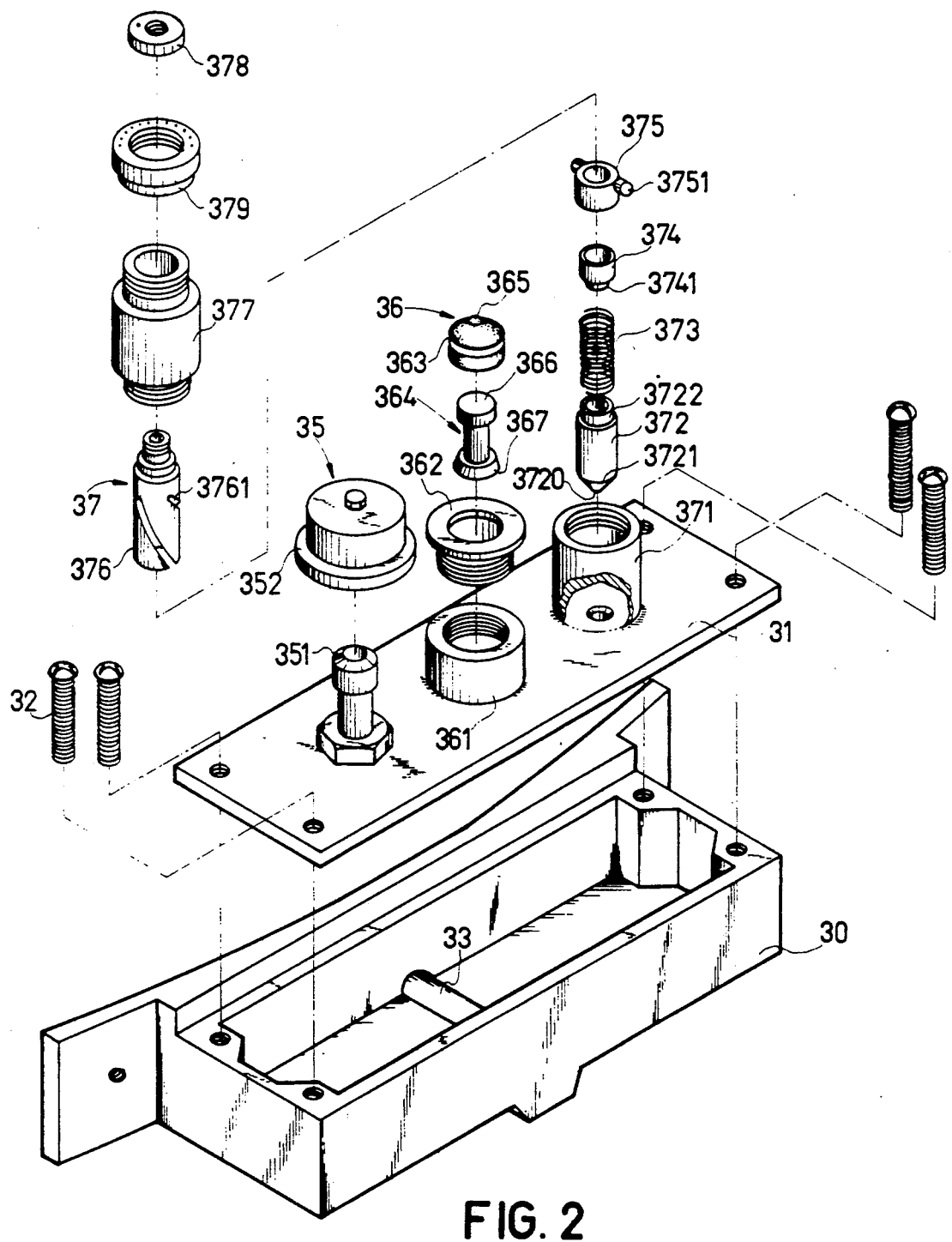
FIG. 2 is a perspective exploded view of one of embodiments of the exhalation valve means of this invention.

Referring to FIG. 2 showing an exploded view of the exhalation valve means 3, a casing 30 together with a packing (not shown) are tightly associated with an upper cover 31 by screws 32, forming a closed space. A circular groove 33 is formed at the bottom of casing 30 receiving a cooling water auto-returning valve 34 (shown in FIG. 3). Three holes are punched on upper cover 31 for respectively receiving a safety valve 35, a breathing valve 36 and a pressure regulating valve 37. Safety valve 35 consists of a hollow cylinder 351 and a gravitation cap 352. On the center of gravitation cap 352 is formed a circular concave portion slightly larger than the hollow cylinder 351. When the pressure in the space between the inner and outer pots is relieved through constant pressure valve 17 and/or pressure regulating valve 37, but the steam still is not properly exhaled in time and the remaining pressure is still larger than weight of gravitation cap 352, the steam will push the cap 352 upward and escape through the gap, thereby ensuring safety. Breathing valve 36 is composed of a base 361, a screw lid 362 having an elastic plug 363 corked in central hole thereof, and a movable valve stem 364 fitted in a central hole 365 of the elastic plug 363.

The central hole 365 of elastic plug 363 is slightly larger than a central cylinder portion 366 but smaller than the base portion 367 of movable valve stem 364. When first heated, steam pressure is not large; steam mainly escapes through the gap between cylinder portion 366 and wall of central hole 365. As heating proceeds, the base portion 367 is pushed up by steam, and hence the elastic plug 363 is pressed tightly against the base portion 367 so that steam can not go through the breathing valve and must be discharged through other valves.

The pressure regulating valve 37 consists of a base 371, a plug 372, a spring 373, a pad 374, a movable member 375, a guiding member 376, a casing 377, a rotary disk 378 and a scale ring 379. The base 371 of pressure regulating valve 37 penetrates the upper cover 31 and is mounted thereon so as to communicate with the space in casing 30. Plug 372 is a hollow body having a front cone portion formed with several exhalation holes 3721, and a small diameter tail projection 3722. Pad 374 is hollow and has a tail projection 3741. Disposed between plug 372 and pad 374 is spring 373. The two protrusions 3751 outside movable member 375 just fit two helical grooves 3761 formed on guiding member 376 and can move therealong. Two inner straight slide channels 3771 formed on the inner surface of fixing casing 377 (see FIG. 2A) allows the vertical motion of movable member 375 with its protrusions 3751 sliding along the slide channels 3771. Installed inside the casing 377 are plug 372, spring 373, pad 374, a movable member 375 and guiding member 376. The assembled parts are then screwed on base 371 via thread of fixing casing 377, and protrude beyond the top of guiding member 376. Scale ring 379 and rotary disk 378 are then screwed on the guiding member 376. Rotation of rotary disk 378 turns guiding member 376, making movable member 375 move up or down along the channels 3771 of casing 377 because of mutual interaction between protrusions 3751 of movable member 375 and helical grooves 3761 of guiding member 376 (please see FIGS. 2A and 4). In this way, the compression force of the spring is adjusted to vary the pressure limit of the plug 372.

Figure 2A:
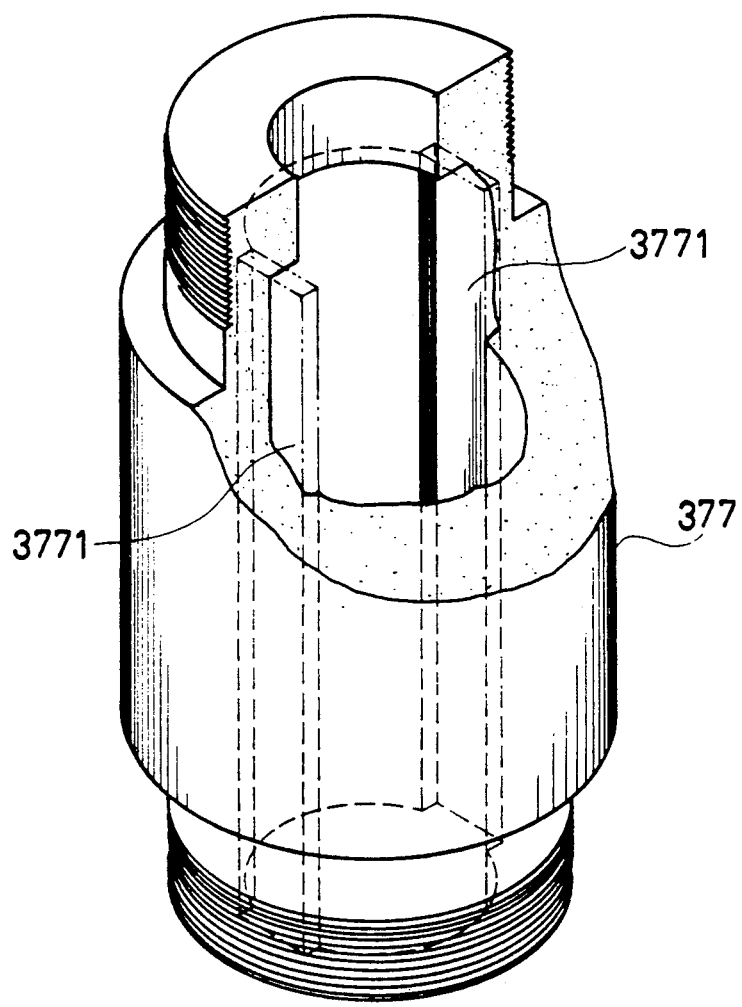
FIG. 2A is a sectional view of the casing of the pressure regulating valve thereof.

Referring to FIG. 2A, which shows sectional view of the fixing casing 377 of the pressure regulating valve, it is seen that two vertical slide channels 3771 are formed therein for sliding of movable member 375.

Figure 3:
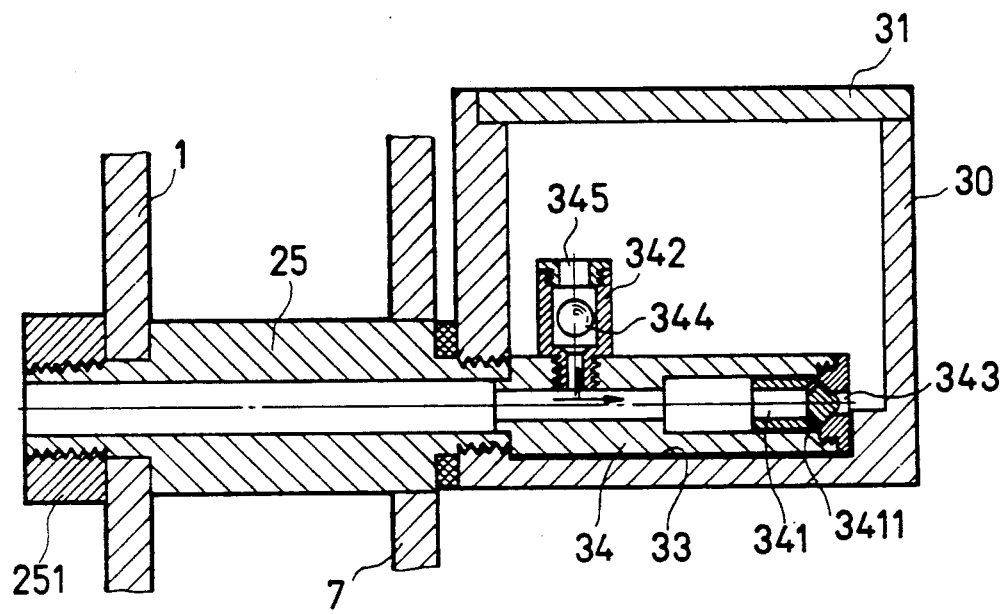
FIG. 3 is a longitudinal sectional view of the cooling water auto-returning valve of this invention.

Referring to the cooling water auto-returning valve in FIG. 3, a communicating tube 25 inserted in a hole punched on outer pot 1 is fixed by a nut 251. Tube 25, piercing outer pot 1 and housing 7, is connected to cooling water auto-returning valve 34 which has a horizontally movable plug 341 at its front end. There are several through holes 3411 at the head of movable plug 341 which can horizontally move freely inside the valve 34. The inner diameter of the front end of the valve is approximately equal to that of plug 341, and they are loosely matched. A vertically protruding spherical plug 342 is provided having a ball 344 which blocks an exit because of its weight. Therefore, the movable plug 341 and spherical plug 342 become one way valves. When the steam generated in outer pot 1 passes through tube 25 and then into cooling water auto-returning valve 34, it pushes movable plug 341 towards outlet 343 to block the same so that steam cannot escape through this plug, and ball 344 is thus pushed upward by the steam which escapes through injection opening 345 of spherical plug into casing 30. When meeting the ambient casing wall, steam condenses and flows back into casing 30. In this way, no steam and water will be sprayed when pressure is relieved. When heating is stopped, the pressure between the inner and outer pots reduces, and the pressure in casing 30 gradually disappears. The weight of ball 344 causes it to fall down and block the exit of spherical plug 342. Condensed water due to pressure difference pushes the movable plug 341 to open the outlet 343 and flow back to the shallow depression 2 of outer pot 1 through holes 3411 of plug 341 until equilibrium of pressure is achieved. Through this, the cooling water recycles automatically.

Figure 4:
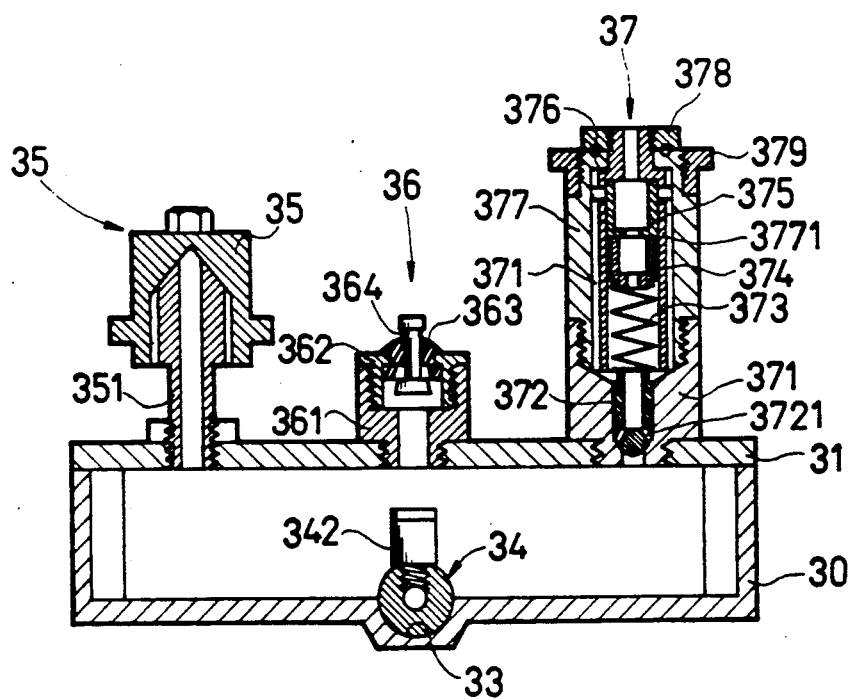
FIG. 4 is an assembled longitudinal sectional view of the exhalation valve means shown in FIG. 2 of this invention.

Referring to the sectional view of the valve set of this invention in FIG. 4, generated steam passes through communicating tube 25 to spherical plug 342 of cooling water auto-returning valve into casing 30. During the initial low pressure period, steam escapes through the gap between elastic plug 363 and movable stem 364 of breathing valve 36. As the heating proceeds and the pressure rises, stem 364 of breathing valve 36 is entirely pushed up to block the hole 365 of elastic plug 363, preventing steam exhalation and leaving only the constant pressure valve (disposed on ring member) and pressure regulating valve available for exhalation. When the pressure is larger than that given to plug 372 by spring 373, steam will push plug 372 open and discharge. For even larger pressures, steam will discharge through safety valve 35 to ensure safety of this invention.

Figures 5A, 6A:
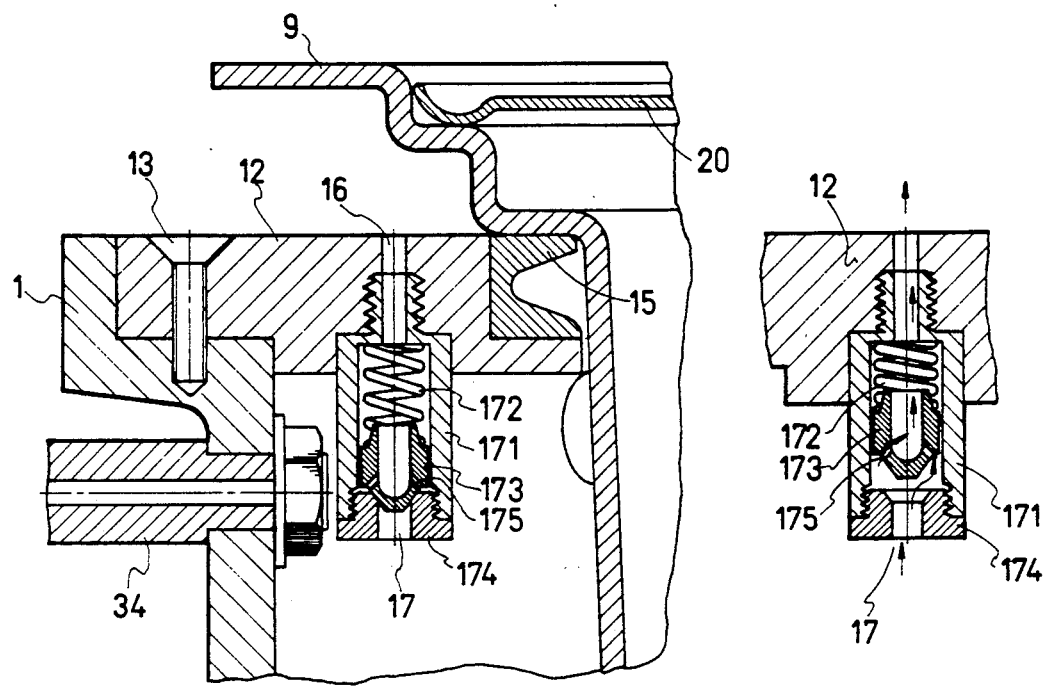
FIG. 5A is a longitudinal sectional view, showing the constant pressure valve thereof, disposed on the ring member in the closed state.
FIG. 6A is a longitudinal sectional view, showing the constant pressure valve of FIG. 5A, raised and opened by the steam.

Referring to constant pressure valve 17 in FIG. 5A, it is composed of a casing body 171, a spring 172, a plug 173 and a screw cork 174. There are several holes 175 formed at the front portion of plug 173. Pressurized by spring 172, plug 173 is opposed against the screw cork 174 so that the space between inner and outer pots is isolated from surrounding.

Referring to FIG. 6A, if the pressing force of steam pressure is greater than the elastic force of spring, plug 173 is pushed open and excessive steam discharges through holes 175.

To make the valves of this invention interchangeable and facilitate procedure of processing and molding, and to decrease amount of stored spare valves, the aforesaid constant pressure valve can be manufactured with the structure as shown in FIGS. 5B and 6B. In this embodiment, the plug members of the safety valve, constant pressure valve and breathing valve are unified in shape. As shown in the drawings, the plug 173 is formed with a hollow conic head and a hollow cylinder body. Moreover, multiple vent holes 175 are formed between the hollow conic head and cylinder body at equal angle to one another. The cylinder body is designed such that the diameter permits the plug 173 to freely slide in casing 171. In particular, the constant pressure valve includes a hollow casing 171 having an inlet 176 and an outlet 177, a tapered passage 178 formed on the inner wall of this inlet 176, a hollow plug body 173 movably disposed in the hollow casing 171 having a conic head 175 near the inlet 176 and a cylinder body near the outlet, multiple vent holes formed between the conic head and cylinder body, a spring 172 disposed between the cylinder body of the hollow plug 173 and outlet 177 of casing 171, a hollow screw cork 174 screwed on one end of the casing 171 to limit motion of the hollow plug within the casing. In the normal state, the spring 172 abuts against the hollow plug 173, making the conic head thereof opposed against the tapered passage 178 of inlet of the hollow casing so as to block the passage. Thus, the constant pressure valve will be closed under the preset compression force of the spring. When the pressure of fluid at the inlet of the casing is greater than the action force of the spring, the hollow plug is raised up to compress the spring, making the conic head of the plug separate from the tapered passage so that the fluid can flow through the inlet and multiple vent holes of the hollow plug and discharge from the outlet 177 of the casing 171. Therefore, the casing 171 an be assembled with the plug 173, spring 172 and screw cork 174 to form constant pressure valve. When the spring 172 is replaced with a spring having larger elastic force, the constant pressure valve will become a safety valve 35 with a function identical to aforesaid embodiment.

Moreover, if the spring of constant pressure valve is eliminated and the plug 173 is reversely disposed in the casing 171, as shown in FIGS. 5C, 6C, then the valve will soon become a breathing valve 36. At initial heating stage, the steam pressure is not so large, and the steam can go into the hollow plug through the inlet of the casing, and flow through multiple vent holes of the plug to discharge from outlet of the casing. When the pressure of the steam increases, the plug is raised by the steam pressure to move along inner wall of the casing, whereby the conic head of the plug contacts the tapered passage and blocks the same so as to prevent the steam from exhalation. When the raising force of the steam is smaller than weight of the plug body, the plug will drop down again, separating the conic head thereof from the tapered passage to form a free passage, thereby permitting the external gas to go therethrough, and the breathing function of the breathing valve is thus performed. Thereby, the valve parts of this invention are improved to facilitate the manufacturing technique thereof and easy management can be achieved.

Figure 7:
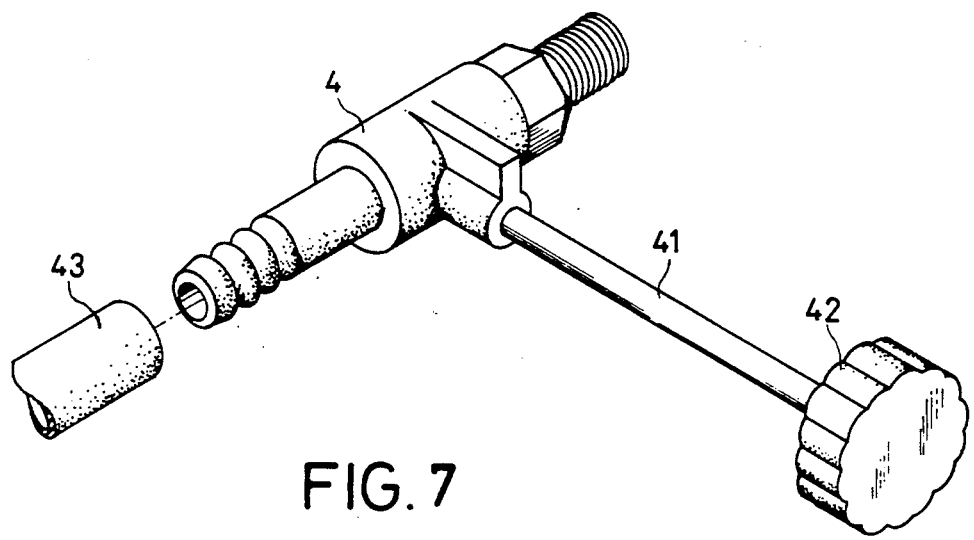
FIG. 7 is a perspective view of the drain valve and drain pipe of the present invention.

With reference to the drain valve and drain pipe in FIG. 7, drain valve 4 is connected to a rod 41 which protrudes beyond housing 7 and has a rotary switch 42 at its protruding end. A drain pipe 43 is screwed to one end of drain valve 4 for drainage while the other end of drain valve 4 is fixed to lowest point of shallow depression 2 of outer pot 1.

Figure 8:
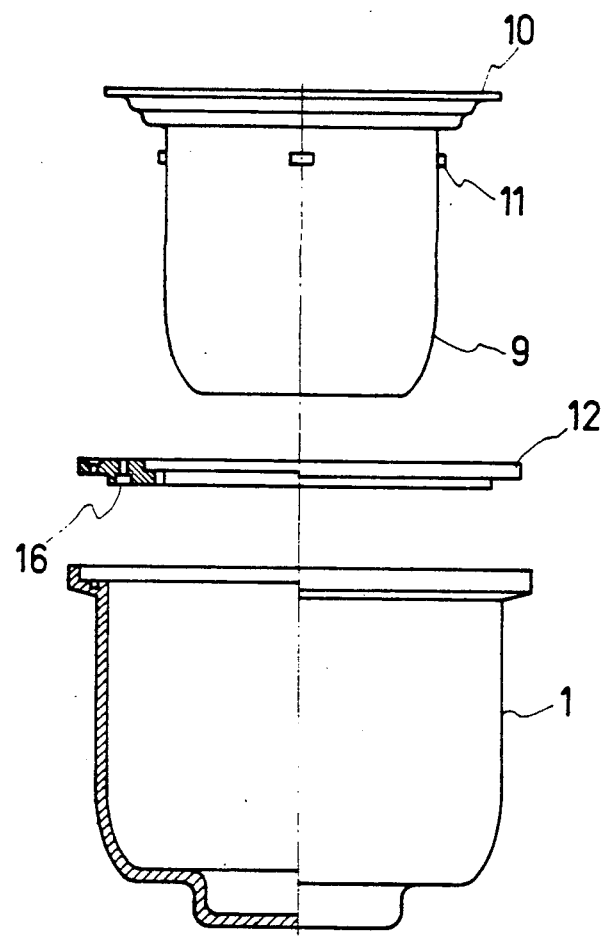
FIG. 8 is an exploded, partially sectional view of the outer pot, inner pot and ring member of this invention.

In FIG. 8, ring member 12 is anchored on the upper edge of outer pot 1 by means of ring packing with V-shaped cross section (not shown in FIG. 8) and several screws. The upper edge of inner pot 9 is formed with a multi-stepped annular flange. The pot wall thereof is formed with several projections 11 which can fit into and pass through recesses 14 of ring member 12 (see FIG. 9) such that inner pot 9 can be associated with and supported by ring member 12. In this way, the inner pot hangs above the outer pot without touching the bottom and wall thereof, forming a well-closed space for heating in the event that water is contained and heated in the depression of outer pot.

Figure 9:
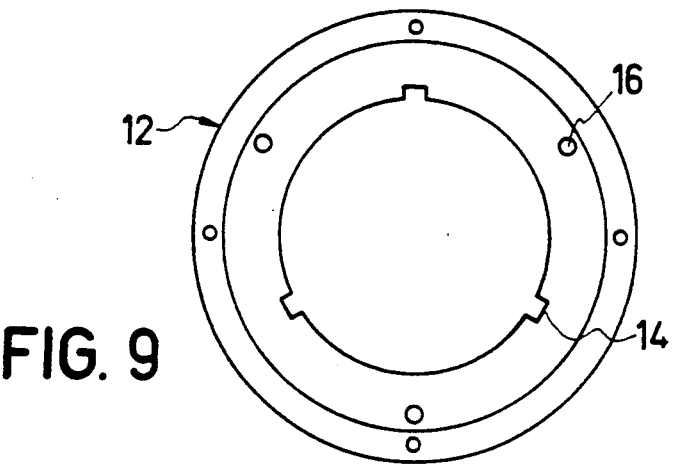
FIG. 9 is a top view of the ring member of this invention.
Figure 16:
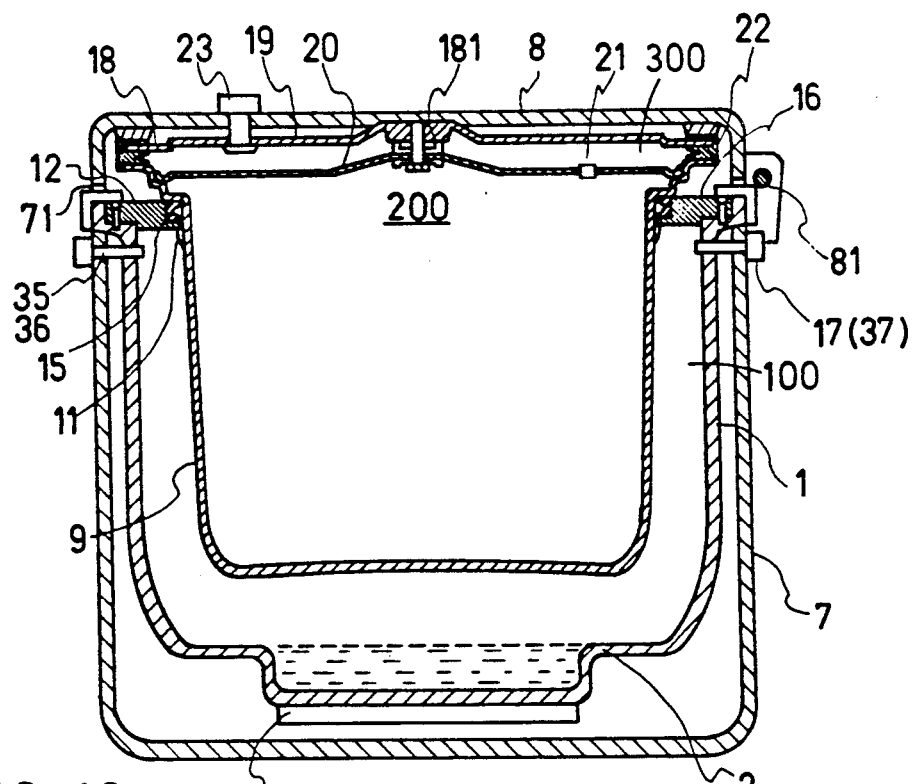
FIGS. 16 to 18 show different ways to mount the exhalation valve means respectively inside and outside the cooker of this invention.
Figure 15:
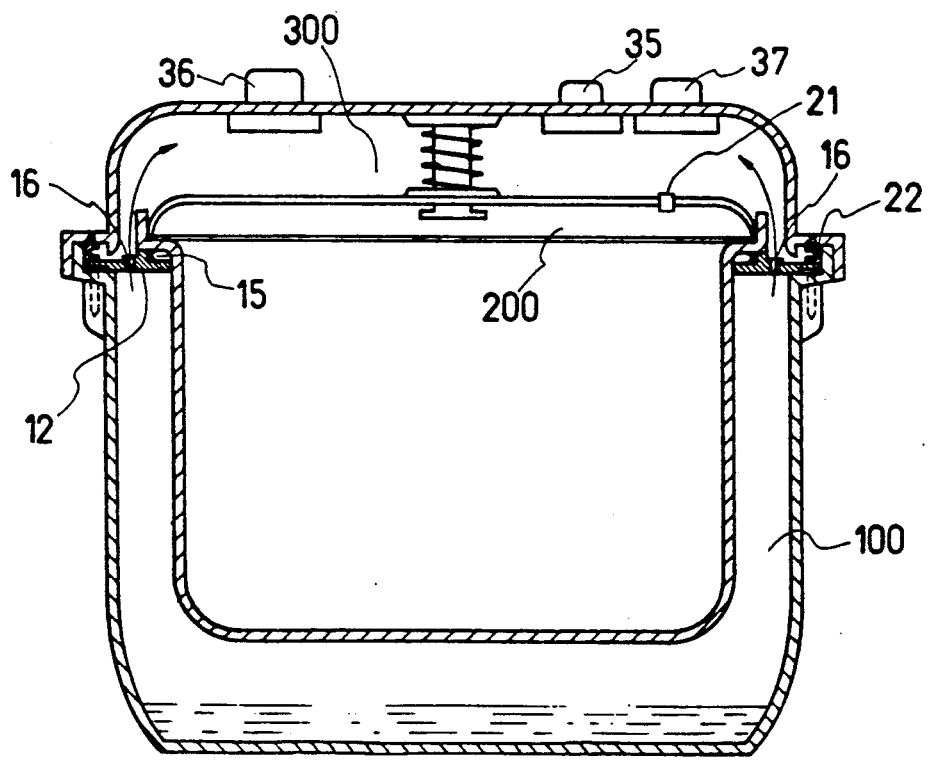
FIG. 15 is a longitudinal sectional view of a fourth embodiment of this invention.

Referring to the ring member in FIG. 9, several recesses 14 are formed along the inner periphery thereof corresponding to projections of inner pot and vent holes 16, wherein the vent holes are suitable for installation of constant pressure valves 17. In a preferred embodiment, no constant pressure valve 17 is disposed and the vent holes 16 are not disposed, as shown in FIG. 16. Of course the vent holes 17 can still remain without installation of constant pressure valve, making the first space 100 communicated with third space 300, as shown in FIG. 15. This will be further described in detail hereinafter.

Some water is added to the shallow depression in the outer pot and food is placed in the inner pot which is then put into central hole of the ring member such that projections 11 of inner pot just fit and pass through the recesses 14 and the inner pot is engaged with the ring member. In this position, the lower side of the upper edge of the inner pot touches the V-shaped ring packing, permitting the inner pot to rotate thereon. When the pot cap assembly is installed, the upper edge of the inner pot is pressed against the V-shaped packing 22 of the upper pot cap, forming the third heating space 300. Meanwhile, the first heating space 100 is formed between inner and outer pots, which can be communicated with casing 30 of exhalation valve means 3 by means of a communicating tube 25.

When the bottom of the outer pot is heated and steam is gradually generated, the heating space between the inner and outer pots is filled with a mixture of hot steam and room temperature air. The mixture flows through the communicating pipe into the cooling water auto-returning valve of the valve set. The vertical spherical plug will be blocked by the ball due to ball weight since the steam is too weak to push it open, and thus horizontal movable plug is pushed forward by steam and again blocks the outlet of the steam. As more steam is generated so that it has sufficient power to push the ball up, some gas escapes through the injejction spout of the spherical plug into casing 30 of exhalation valve means 3. Among exhalation valve means, the movable steam of the breathing valve requires the least pressure for relieving, and therefore the aforesaid hot steam and room temperature air mixture can be exhaled properly through breathing valve.

As the heating proceeds and the amount of steam increases, movable stem is pushed by the steam and blocks the breathing valve. At this moment, the V-shaped ring packing between inner pot and ring member suffering the pressing of steam at its mouth opens gradually, finally touching more closely the upper edge of inner pot, and hence forming a perfect closed heating space.

As more steam is generated in further heating, steam fills up the whole space between the inner and outer pots, and uniformly transfers heat to the inner pot bottom and wall. According to heat conduction principles, the temperature difference between high temperature steam and cold food in inner pot is great and it is not likely to reach an isothermal state in an instant because of the heat barrier. Therefore, the heat cannot be immediately transferred into the inner pot, and as heating proceeds, the heat conducting rate cannot catch up with steam generation rate, subsequently causing an increase of pressure which can be adjusted by discharging some steam through the constant pressure valve on the ring member or the pressure regulating valve on the exhalation valve means 3. Steam exhaled through the constant pressure valve passes through gap 71 between the outer cover and the housing into the atmosphere (Gap 71 exists between the outer cover and housing when they are associated.).

In this way, the steam pressure in the first space 100 can be maintained steady. Before the steam pressure rises to the exhalation level, all of the heat energy generated is conducted repeatedly to the inner pot to raise the food temperature. This action is repeated again and again until the steam pressure reaches exhalation level. In other words, although the short cycle of pressure relieving is repeated, the temperature of the food and the inner pot will rise in every steam exhalation.

When the food and inner pot temperatures rise gradually, the heat conduction barrier disappears. From this moment on, heat is directly conducted to the inner pot and thus the food, giving the greatest heating response.

Steam which is generated in the inner pot during boiling flows through the vent hole opening of lower pot cap, and detours to the breathing valve on the upper pot cap, and is finally discharged into the atmosphere. The two-way venting valve can ensure that the lower pressure steam which is generated is not completely discharged into air but is retained for some time between the lower pot cap and the inner pot, thus enhancing the heating effect. As more steam is generated which cannot escape from inner pot, it presses the V- shaped mouth of the V-shaped ring packing on the outer boundary of the upper pot cap, forming a tight contact between the packing and upper pot cap and upper edge of inner pot, forming a perfect closed heating space.

When food in the inner pot is heated and excessive steam is generated, the steam will push the breathing valve open and discharge outward. If the steam in lower pot cap is too much, then the buffer pad of cap assembly will be raised by the steam, permitting the same to escape through periphery of lower pot cap into the third space between upper and lower pot caps, and then discharge to atmosphere through the two-way venting valve 23.

When heating is terminated, steam will be exhaled by two-way venting valve for a certain time. This action will slow down and finally stop so that a certain amount of steam and heat can be retained between the inner pot and pot caps to closedly steam food. Atmospheric air will slowly flow back into inner pot through said two-way venting valve 23, thereby balancing the pressures existing on two sides of pot cap assembly for easy opening of outer cover.

On termination of heating, the two-way venting valve can remain in the closed state for some time (due to the small pressure limit), keeping some steam in first space for further closedly steaming the inner pot. When the pressure between the inner and outer pots reduces, the movable stem drops down, permitting external air to slowly flow in through the gap.

Moreover, the movable ball of spherical plug of the cooling water auto-returning valve drops down also due to its weight after heating stops, thereby blocking the exit. Condensed water compelled by inflowing air pushes the horizontal movable plug open, and flows back to the shallow depression of the outer pot. Thus, the problem of water accumulation in valve casing of exhalation valve means 3 is eliminated.

Because of the entire uniform and indirect heating by steam and separation of inner pot from outer pot, every part of food in inner pot can be evenly and entirely heated and boiled under the same temperature and pressure by steam heat conduction step by step. In addition, as food is heated step by step, it fully absorbs the thermal energy and its flavor and nutrition can be completely preserved. Furthermore, because the steam is effectively used, cooking time is shortened and energy is saved.

Please now further refer to FIGS. 10 to 19 for a better understanding of other preferred embodiments of the present invention.

Figure 10:
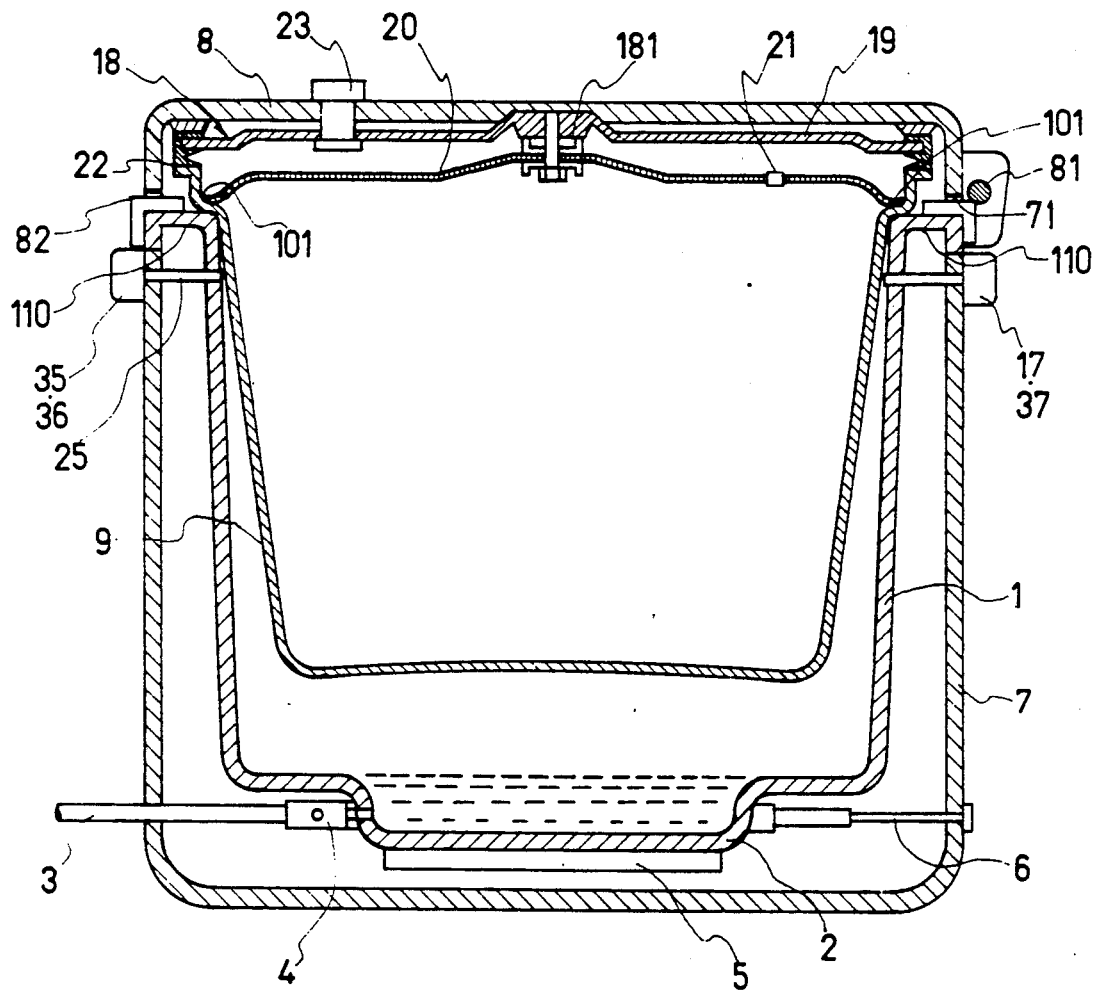
FIG. 10 is a longitudinal sectional view of a second embodiment of the invention.

FIG. 10 shows a longitudinal sectional view of a second embodiment of this invention, wherein the inner pot 9 is hung above the outer pot 1. In this embodiment, the inner pot is directly air-tightly supported in the outer pot without using ring member. The upper externally extending annular flange 110 of outer pot 1 is air-tightly engaged with corresponding upper externally extending annular flange 101 of the inner pot, resulting in the inner pot being spaced from the bottom and wall of the outer pot to achieve the identical effect as the first embodiment. In this embodiment, the safety valve 35, breathing valve 36 and pressure regulating valve 37 or constant pressure valve 17 are all disposed on the peripheral wall of the outer pot, while the other fittings are the same as first embodiment and will not be further described herein.

Figure 11:
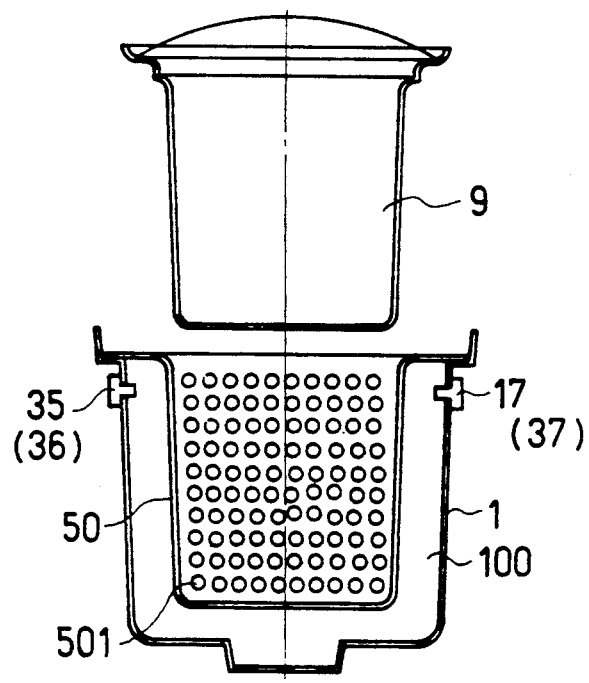
FIGS. 11 and 12 are two exploded views respectively illustrating two forms of a third embodiment thereof.
Figure 12:
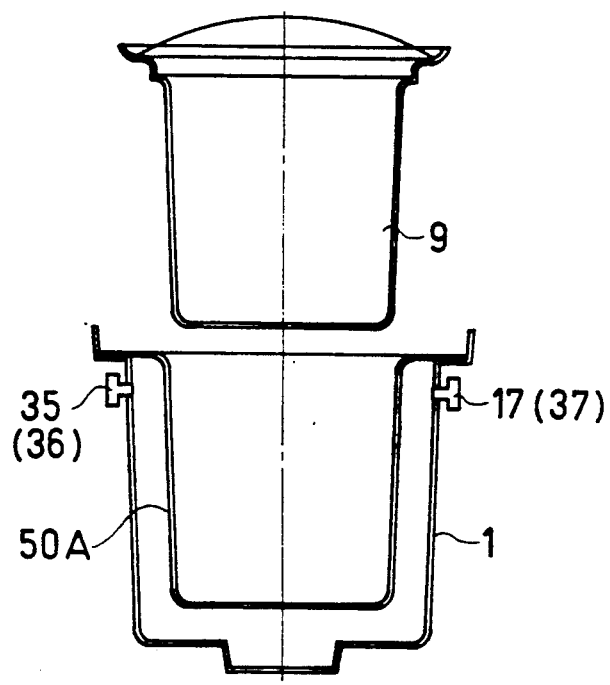

In FIGS. 11 and 12, a third embodiment of this invention is shown, wherein by means of a perforated metal heat-conducting pot 50 (as shown in FIG. 11) or a solid metal heat-conducting pot 50A (as shown in FIG. 12), the inner pot is hung above inside the outer pot, forming a first space 100 between heat-conducting pot 50 or 50A and outer pot 1. The inner pot 9 is sealedly fitted into the heat-conducting pot and closely associated therewith, whereby thermal energy in the first space 100 can be conducted to inner pot 9 through solid heat-conducting pot 50A or through vent holes 501 of the perforated heat-conducting pot 50 to entirely and uniformly heat the food contained in the inner pot at same temperature and pressure as performed in the above embodiments so as to achieve the identical effect.

Figure 13:
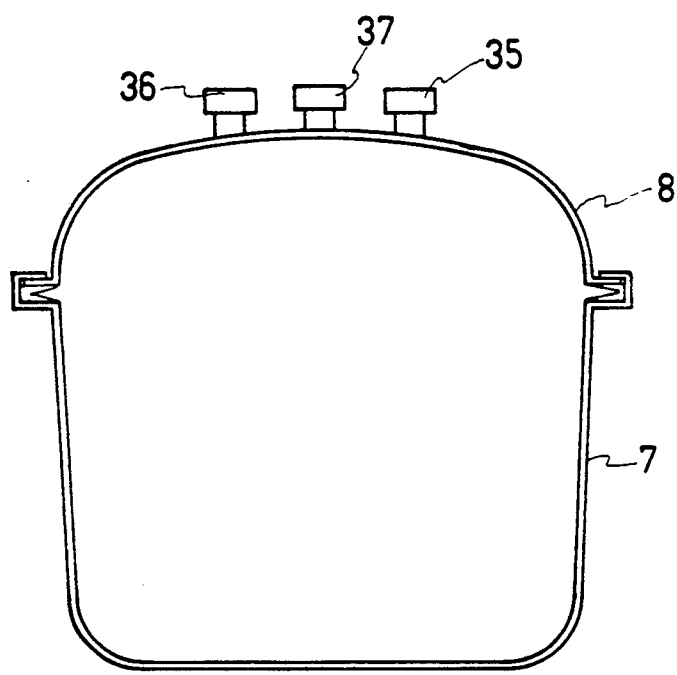
Figure 14:
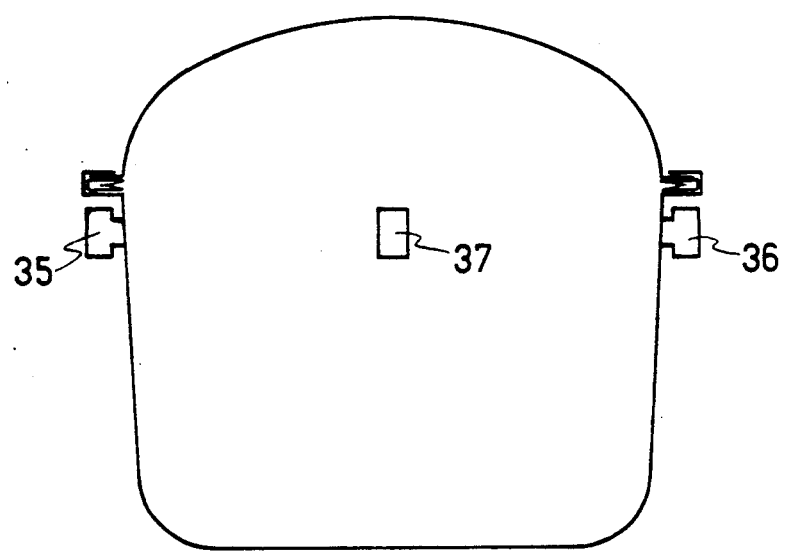

In FIGS. 13 and 14, two forms of installation of exhalation valve are shown. FIG. 13 illustrates that the breathing valve 36, safety valve 35 and pressure regulating valve 37 (or constant pressure valve 17) are all disposed on the pot cap of the outer pot. FIG. 14 illustrates these valves mounted on the pot wall of the outer pot to achieve same function as above-mentioned embodiment.

FIG. 15 shows a fourth embodiment of the present invention, wherein the vent holes 16 of the ring member 12 are open without mounting any exhalation valve thereon, making the first and third heating spaces communicating with each other. The exhalation valves are all alternatively disposed on the pot cap, making the inner pot thoroughly surrounded by the first and third heating spaces to achieve the heating and cooking effect as above described.

Figure 17:
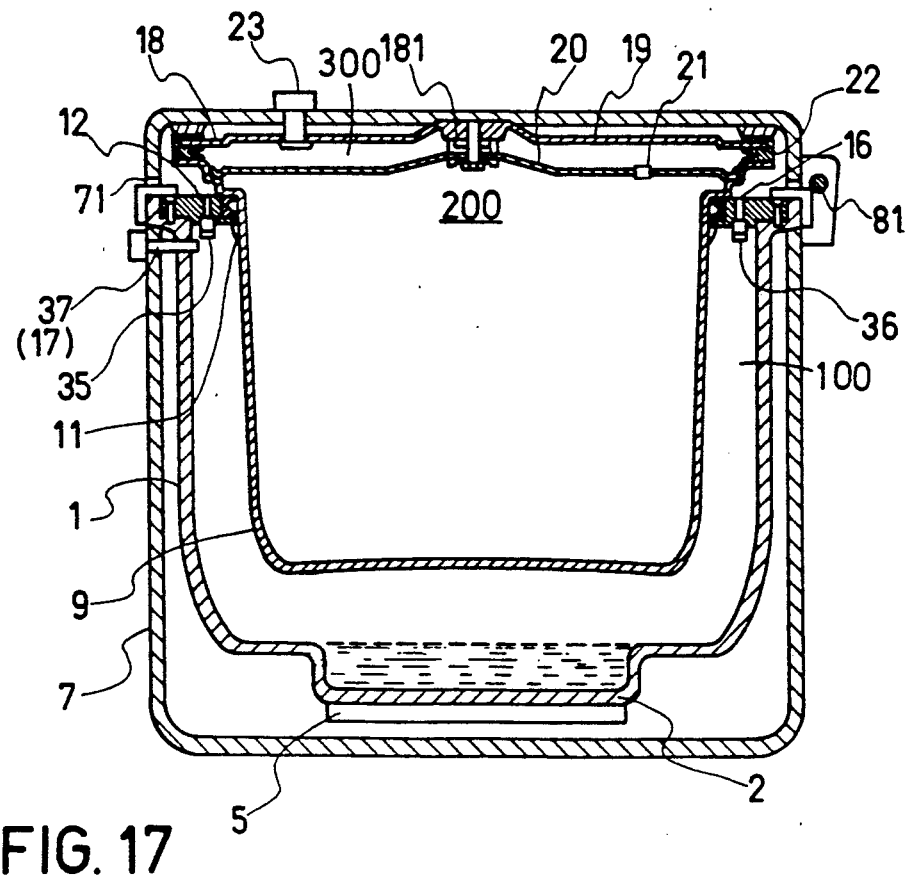
Figure 18:
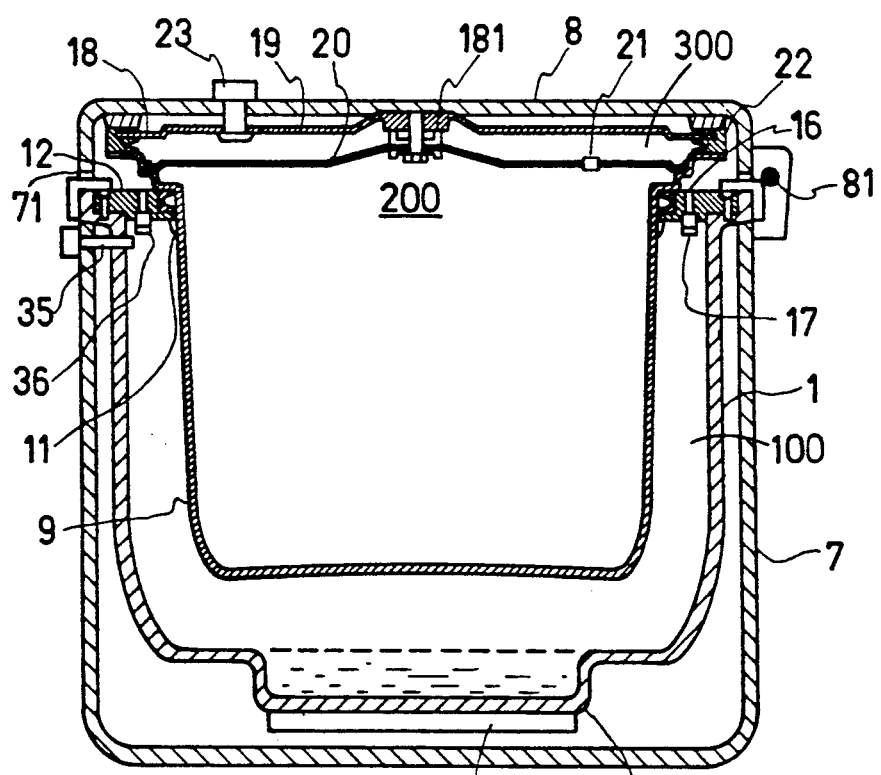

FIGS. 16 to 18 respectively show alternative embodiments of the installation of the exhalation valves on the cooker, wherein FIG. 16 shows that the ring member 12 is of sealed type, resulting in the first space being isolated from the atmosphere and the safety valve 35, breathing valve 36, constant pressure valve 17 or pressure regulating valve 37 mounted on the pot wall of the outer pot are used to adjust the steam pressure, while the other parts are same as the above embodiments. FIG. 17 shows the safety valve 35 and breathing valve 36 disposed on the ring member 12, and the constant pressure valve 17 or pressure regulating valve 37 mounted on the pot wall of the outer pot. FIG. 18 shows the constant pressure valve 17 and breathing valve 36 disposed on the ring member 12, while the safety valve 35 is mounted on the pot wall of the outer pot to also achieve the function as described in the above embodiments.

Figure 19:
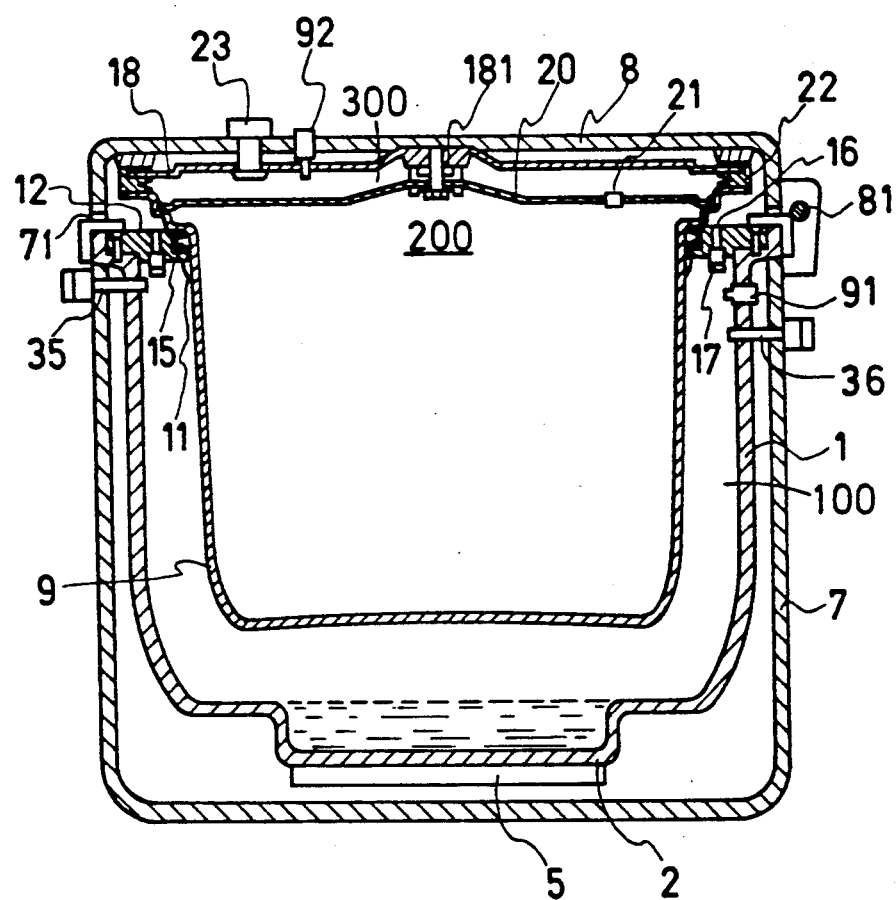
FIG. 19 is a longitudinal sectional view of a fifth embodiment of the invention.

Additionally, to meet the requirements of different cooking temperature for different foods, temperature control means 91, 92 can be further mounted as shown in FIG. 19 in addition to the above-mentioned exhalation valves. By means of cooperation of the exhalation valves and temperature control means, the best accurate boiling temperature can be precisely controlled as necessary to keep the natural nutrients and flavors of various foods and to acquire better cooking effect.

Since the heater, temperature control breaker or timer mentioned above are all of conventional arts, they will not be discussed herein.

I claim:

1. An entirely uniformly heated responsive cooker, comprising:

an outer pot containing water in the inner bottom portion thereof;

a heating element disposed under the bottom of said outer pot;

a ring member having a first airtight ring packing means at its inner circumference which is airtightly disposed on and supported by the top of said outer pot;

an inner pot formed with a multi-stepped annular flange on the top portion thereof, the periphery of said inner pot being airtightly removably disposed in the inner circumference of said ring member, making the bottom and outer wall of said inner pot spaced from said outer pot, forming a first space between bottoms and walls of said inner and outer pots;

a pot cap assembly airtightly fitted on said multi-stepped annular flanges of said inner pot by means of a second airtight ring packing means, forming a second space between said pot cap assembly and food contained in said inner pot, said second space being completely and independently isolated form said first space so as to prevent the water in the inner bottom portion of said outer pot from contaminating the food in said inner pot;

a first exhalation valve means having an adjustable predetermined exhalation pressure level and disposed in said first space to regulate thermal energy and pressure in said first space; and a second exhalation valve means including a vent hole and a two-way venting valve which are disposed in said second space to regulate thermal energy and pressure in said second space;

whereby when the thermal energy and pressure in said first space increase gradually and reach said predetermined exhalation pressure level for said first exhalation valve means, a further temporary pressure relieving and regulating movement is performed such that the temporary pressure regulating movement is repeatedly performed and after each cycle of pressure relieving and regulating movement, the food temperature in said inner pot is responsively increased until the thermal energy conduction barrier between said first space and inner pot disappears, permitting the thermal energy produced in said first space to be directly conducted to said inner pot and making the food in said inner pot surrounded by thermal energy in said first space, and heated and boiled entirely uniformly under the condition of constant temperature and pressure so as to maintain the original taste and nutrition of food and fully effectively utilize thermal energy to save cooking time and energy.

2. A cooker of claim 1, wherein said second exhalation valve means is capable of discharging gas from said second space into the atmosphere and balancing the amount of atmospheric air flowing into said second space.

3. A cooker of claim 1, wherein said pot cap assembly comprises an upper pot cap and a lower inner pot cap, the outer periphery of the upper pot cap of said pot cap assembly being airtightly associated with the multi-stepped annular flange of the top portion of the inner pot by means of said second airtight ring packing means, and the outer edge of the lower inner pot cap being disposed on the middle portion of said multi-stepped annular flange of said inner pot so as to form a third space between the upper pot cap and the lower pot cap.

4. The cooker of claim 3, wherein a vent hole is formed on said lower inner pot cap so that said second and third spaces are limitedly communicated with each other through said vent hole.

5. A cooker of claim 3 or 2, wherein said vent holes are formed in said lower inner pot cap and said two-way venting valve means is disposed on said upper pot cap, and a buffer pad is disposed between said upper pot cap and said lower inner pot cap.

6. A cooker of claim 1, wherein said first exhalation valve means comprises a constant pressure valve mans.

7. A cooker of claim 6, wherein said constant pressure valve includes a casing, a spring, a plug and a screw cork, wherein several circular holes are formed at the front end of said plug, and said plug is pressed by said spring to abut against said screw cork, said constant pressure valve being disposed on said ring member or on a wall of the outer pot, by using a communicating pipe means to communicate with said first space between said inner and said outer pots, whereby when the steam pressure in said first space between said inner and outer pots is larger than a predetermined spring compression force of said constant pressure valve, said plug is raised to an open position, permitting excessive steam to discharge through said circular holes.

8. A cooker of claim 6, wherein said constant pressure valve includes:

a hollow casing having an inlet and an outlet, a tapered passage being formed on an inner wall of said inlet, a hollow plug disposed in said hollow casing, having a conical head portion near said inlet of said casing, and a cylindrical body portion near said outlet of said casing, several vent holes being formed between said conical head and cylindrical body portions; and a spring disposed between said cylindrical body portion of said hollow plug and outlet of said hollow casing, whereby in a normal state, said spring abuts against said hollow plug, making said conical head portion thereof abut against said tapered passage of said inlet of said hollow casing to block the passage so that said constant pressure valve is in a constant pressure closed state under a predetermined compression force of said spring, while when the pressure of a fluid at said inlet of said casing is larger than the compressive force of said spring, said hollow plug is raised to compress said spring, forcing said conical head portion of said hollow plug to separate from said tapered passage of said casing, permitting the fluid to flow through said inlet and said vent holes of said hollow plug and then discharge from said outlet of said casing.

9. A cooker of claim 1, wherein said first exhalation valve means comprises a pressure regulating valve means capable of being manually adjustable for manually adjusting the pressure in said first space according to the varieties of foods cooked in said inner pot so as to achieve optimum heating and cooking effects on food contained in said inner pot.

10. A cooker of claim 6 or 9, wherein said first exhalation valve mans further includes a breathing valve and a safety valve.

11. A cooker of claim 10, wherein said ring member is formed with vent holes for mounting said constant pressure valve and safety valve and breathing valve thereon.

12. A cooker of claim 6 or 9, wherein said first exhalation valve means further includes a cooling water auto-returning valve.

13. A cooker of claim 1, wherein the bottom of said outer pot is formed with a depression for reserving the water, whereby the level of said reserving water will not contact the bottom of said inner pot and the reserved water can be heated by said heating element to produce hot steam, making said first space serve as a steam heating space.

14. A cooker of claim 1, wherein inner circumference of said ring member is formed with several recesses, and the outer periphery of said inner pot is correspondingly formed with several projections so that said inner pot can be rotatably fitted into said ring member by said projections being aligned with said recesses and then rotated so as to firmly fit said inner pot into said ring member.

15. A pressure regulating valve used in a cooker, which has a pot body and a pot cap, comprising:
   a base formed with a conical hole;
   a plug having a front conical portion, the side wall of which is formed with several vent holes communicating with the inner portion of said plug, and a narrowed portion forming a protrusion at the rear of the plug;
   a hollow circular pad, the bottom of which has a projection portion;
   a spring mounted between said rear protrusion of said plug and said projection portion of said circular pad;
   a movable member, the outer periphery of which is formed with several projections;
   a guide member formed with several helical grooves along which said projections of said movable member can move;
   a fixed casing, the inner side of which is formed with several straight slide channels capable of guiding said projections of said movable member therealong;
   a scale ring; and
   a rotary disk, whereby
   said fixed casing is associated with said base with said plug, spring, circular pad, movable member and guide member disposed therein, wherein the top portion of said guide member protrudes beyond said fixed casing in which said scale ring and rotary disk are secured to said top portion of guide member so that by means of turning said rotary disk, said guide member is driven to rotate, making said movable member move up or down along said straight slide channels of fixed casing via an interaction force between said projections of said movable member and said helical grooves of the guide member, the compression force of said spring being adjusted in this way to set the pressure limit of said plug.

16. A pressure regulating valve of claim 15, wherein said pressure regulating valve is disposed on the pot cap of said cooker.

17. A pressure regulating valve of claim 15, wherein said pressure regulating valve is disposed on a wall of said pot body of the cooker to regulate pressure therein.

* * * * *